United States Patent
Nakatani et al.

(10) Patent No.: US 8,611,831 B2
(45) Date of Patent: Dec. 17, 2013

(54) TRANSMISSION DEVICE

(75) Inventors: Koji Nakatani, Hiratsuka (JP); Shu Yamada, Hiratsuka (JP); Sigeki Sakakibara, Hiratsuka (JP); Michito Kaneko, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/884,532

(22) PCT Filed: Jul. 14, 2011

(86) PCT No.: PCT/JP2011/066130
§ 371 (c)(1),
(2), (4) Date: May 9, 2013

(87) PCT Pub. No.: WO2012/063527
PCT Pub. Date: May 18, 2012

(65) Prior Publication Data
US 2013/0231063 A1  Sep. 5, 2013

(30) Foreign Application Priority Data
Nov. 10, 2010  (JP) .................................. 2010-251820

(51) Int. Cl.
*H04B 1/46* (2006.01)

(52) U.S. Cl.
USPC ................ 455/80; 455/77; 455/81; 455/101; 455/103; 455/120; 455/124; 455/503; 340/7.22; 340/870.06; 340/447; 340/449; 340/870.17; 340/572.1; 340/445; 343/895; 343/700 MS

(58) Field of Classification Search
USPC ......... 455/80, 77, 101, 120, 124, 503, 81, 103
See application file for complete search history.

(56) References Cited

U.S. PATENT DOCUMENTS 5,019,815 A * 5/1991 Lemelson et al. ............. 340/933
5,889,424 A * 3/1999 Iwata et al. .................... 327/355

(Continued)

FOREIGN PATENT DOCUMENTS

| JP | 06-068326 A | 3/1994 |
|----|----|----|
| JP | 2008-153783 A | 7/2008 |
| JP | 2008-294604 A | 12/2008 |
| JP | 2010-175298 | 8/2010 |

OTHER PUBLICATIONS

International Search Report of corresponding International Application No. PCT/JP2011/066130, dated on Aug. 9, 2011.

*Primary Examiner* — Marceau Milord
(74) *Attorney, Agent, or Firm* — Global IP Counselors, LLP

(57) ABSTRACT

Numeric values "a" representing a respective order of transmission by a plurality of transmitting units, and a numeric value N representing the total number of transmitting units, are set for each of the transmitting units. At startup, a transmitting unit for which the value "a" representing the order of transmission of the unit has been set to 1 sets a trigger value to N and transmits information about the value "a" of the unit and detection information from a sensor, and, when the value N is detected from a received signal, transmits the value "a" of the unit and detection information. When a value of a–1 is detected from a received signal, the transmitting unit for which the value "a" representing the order of transmission of the unit has been set to other than 1 transmits the information of the value "a" of the unit and detection information.

8 Claims, 11 Drawing Sheets

(56) References Cited

U.S. PATENT DOCUMENTS

| | | | |
|---|---|---|---|
| 5,969,631 A * | 10/1999 | Ammler et al. | 370/514 |
| 6,448,903 B1 * | 9/2002 | Hattori | 340/870.01 |
| 6,486,800 B1 * | 11/2002 | Hattori | 340/984 |
| 7,348,879 B2 * | 3/2008 | Nakatani et al. | 340/442 |
| 7,661,299 B2 * | 2/2010 | Kusunoki | 73/146 |
| 7,701,326 B2 * | 4/2010 | Nakatani et al. | 340/442 |
| 8,026,802 B2 * | 9/2011 | Shimura | 340/442 |
| 2008/0143512 A1 | 6/2008 | Wakisaka et al. | |

* cited by examiner

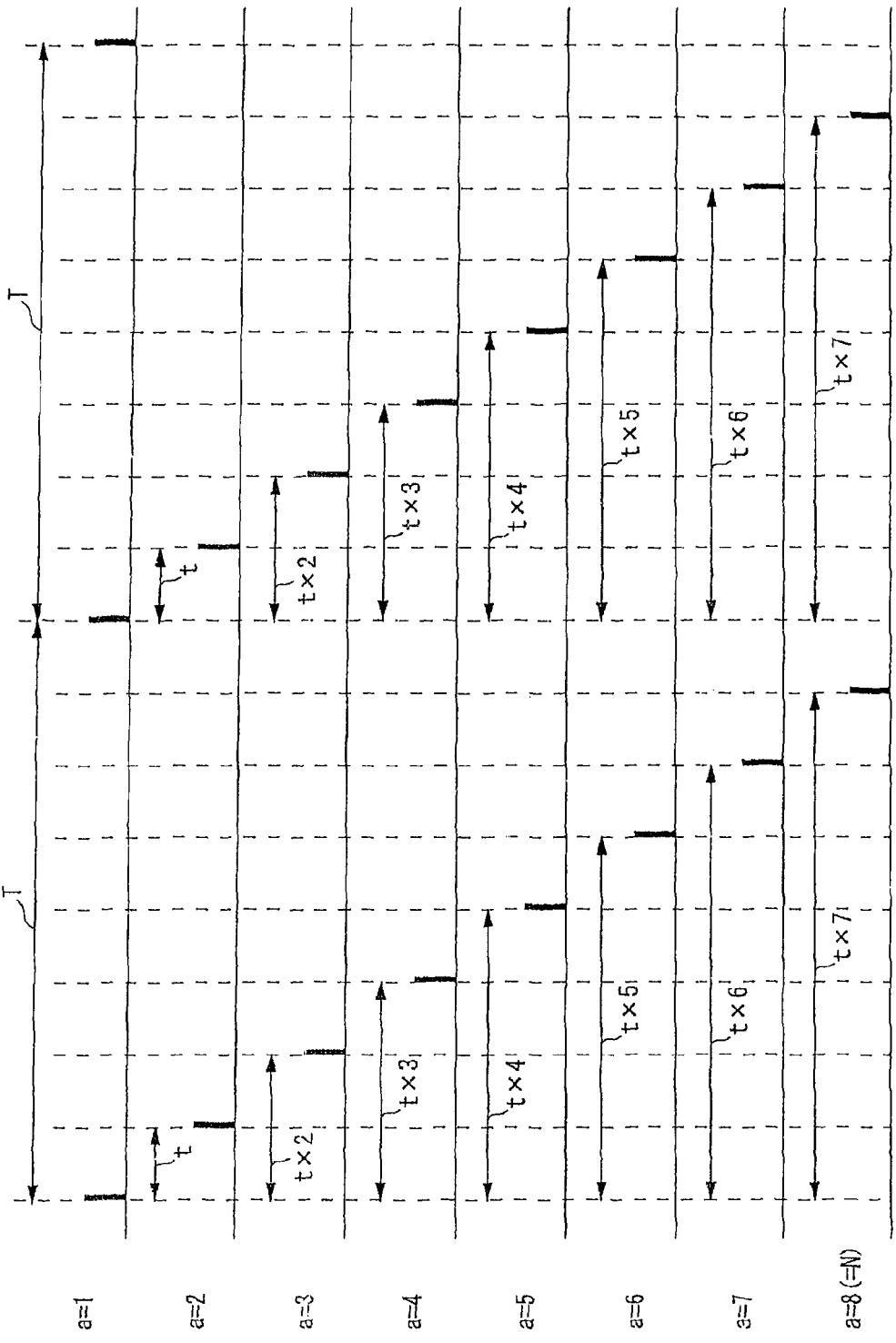
FIG. 15 START-UP

TRANSMISSION DEVICE

CROSS-REFERENCE TO RELATED APPLICATIONS

This U.S. National stage application claims priority under 35 U.S.C. §119(a) to Japanese Patent Application No. 2010-251820, filed in Nov. 10, 2010, the entire contents of Japanese Patent Application No. 2010-251820 are hereby incorporated herein by reference.

BACKGROUND

1. Field of the Invention

The present invention relates to a transmission device constituted by a plurality of transmitting units, such that transmitting of information can take place at shorter time intervals than the transmission pause time.

2. Background Information

Conventionally, there are known transmission devices that employ transmitting units equipped with sensors and are adapted to transmit detected values for physical states that have been detected by the sensors, such as temperature, humidity, pressure, or the like, to a remote location by radio waves.

For example, in pneumatic fenders of the sort employed when bringing a boat alongside a pier or alongside another boat, it is known to detect the internal air pressure by the sensor of a transmitting unit, and to employ the transmitting unit to transmit detected values to a remote location by radio waves, where the values are received so that the internal air pressure can be monitored without contacting the pneumatic fender.

As an example thereof, a plurality of transmission devices are provided in the device disclosed in Japanese Patent Laid-open No. 2010-175298 in order for information to be transmitted at shorter time intervals than a regulated transmission pause time. By using an external wireless starting device and setting the timing at which each of the transmission devices transmits so that the timing will be sequentially staggered over predetermined intervals, it is possible for transmissions to be made by the plurality of transmission devices at shorter time intervals than the transmission pause time.

SUMMARY

However, in the aforedescribed prior art device, the external wireless-type startup device is merely used for setting the transmitting timing of each transmission device; therefore, once the transmitting timing has been set, the external wireless-type startup device is no longer needed, but the cost is commensurately higher.

An object of the present invention is to provide a transmission device for automatically setting the transmitting timing in a plurality of transmitting units, simply through communication among the transmitting units.

In order to achieve the aforedescribed object, the present invention proposes a transmission device including N number of transmitting units for transmitting predetermined information by radio waves of identical frequency each time that a given time T elapses, wherein in the transmission device, each of the transmitting units includes with: information storage means for storing, from among preset numbers from 1 to N representing a transmission sequence, the numeric value N, as well as a numeric value unique to the unit, which is different from numeric values stored in other transmitting units; trigger value determining means for, when a value obtained by subtracting 1 from the numeric value unique to the unit is positive, storing the subtraction result as a trigger value, or when the subtracted value is negative, storing the value of N as a trigger value; receiving means for receiving radio waves of the frequency; at-startup transmitting means for transmitting the numeric value unique to the unit and the predetermined information when the numeric value unique to the unit is 1 at startup; detection means for detecting the numeric value from a radio wave signal received by the receiving means; clocking means for clocking time elapsed after the detected numeric value matches the trigger value; and transmitting means for transmitting the predetermined information and the numeric value unique to the unit when the elapsed time clocked by the clocking means matches a predetermined time t that is less than the given time T.

According to the present invention, in each of the transmitting units, there is stored a numeric value showing a transmission sequence, and there is also stored a trigger value equal to the numeric value that precedes by 1 the numeric value; and once a predetermined time t has elapsed since a signal including the trigger value has been received, the transmitting unit transmits predetermined information, and the numeric value of the unit itself. Therefore, the transmission interval time of the transmitting units is equal to the time t, and information is transmitted in order from the transmitting units, each time that the time t elapses. Information is transmitted each instance that time t elapses, which is less than the given time T.

Moreover, in order to achieve the aforedescribed object, the present invention proposes a transmission device equipped with N number of transmitting units for transmitting predetermined information by radio waves of identical frequency each time that a given time T elapses, wherein the transmission device includes a single reference transmitting unit, the reference transmitting unit having: information storage means for storing a value of 1, as a preset numeric value unique to the unit, the numeric value representing a transmission sequence, and reference transmitting means for transmitting the predetermined information and the numeric value unique to the unit each time that the given time T elapses; and the transmitting units other than the reference transmitting unit having: information storage means for storing, from among preset numbers from 1 to N, the numeric value unique to the unit other than 1, the numeric value representing a transmission sequence and differing from numbers stored in other transmitting units, factor determining means for storing as a factor c a value obtained by subtracting 1 from the numeric value unique to the unit, receiving means for receiving radio waves of the frequency, detection means for detecting the numeric value from a signal of radio waves received by the receiving means; clocking means for clocking time elapsed after the numeric value detected by the detection means matches 1, and transmitting means for transmitting the predetermined information when the elapsed time clocked by the clocking means matches a time obtained by multiplying, by the factor c, a predetermined time t shorter than the given time period T.

According to the present invention, in each transmitting unit, there is stored a numeric value showing a transmission sequence. A reference transmitting unit, whose numeric value is equal to 1, transmits predetermined information each time that a given time period T elapses. The transmitting units other than the reference transmitting unit perform clocking of elapsed time subsequent to having received the signal transmitted by the reference transmitting unit, and transmit the predetermined information when the elapsed time so clocked matches a time calculated by multiplying a time t by a numeric value showing an order unique to that unit. Therefore, with reference to transmission by the reference transmitting unit, the transmission interval time of the transmitting units is equal to the time t, and information is transmitted in order from the transmitting units each time that the time t elapses. Information is transmitted at each instance the time t elapses, which is less than the given time T.

In the transmission device of the present invention, since the transmitting units are formed in the aforedescribed manner, it is possible to automatically transmit information in order among the plurality of transmitting units each time that a predetermined time t elapses, on the basis of numeric values showing an order of transmission preset for each of the transmitting units, thereby obviating the need to prepare an external wireless-type startup device for the sole purpose of setting the transmitting timing of the transmitting units, as in the prior art example. A superfluous external wireless-type startup device is thereby obviated, and costs can be reduced.

BRIEF DESCRIPTION OF THE DRAWINGS

FIG. 15 is a timing chart describing operation of a transmitting unit in the example 2 of the present invention.

DETAILED DESCRIPTION OF EMBODIMENTS

An embodiment of the present invention is described below with reference to the drawings.

Figure 1:
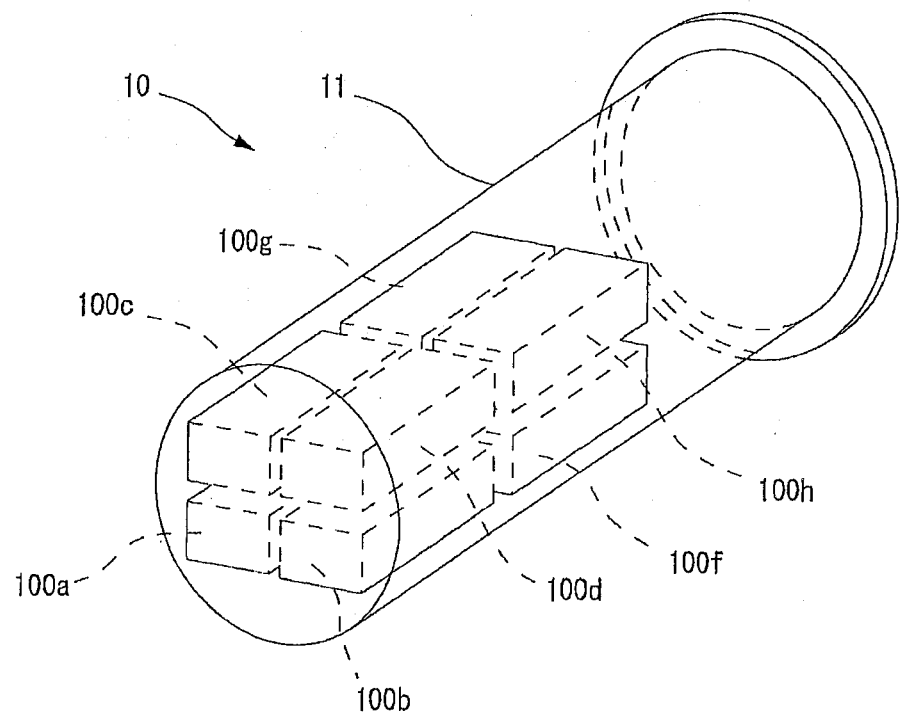
FIG. 1 is an exterior view showing a transmission device in an embodiment of the present invention.
Figure 2:
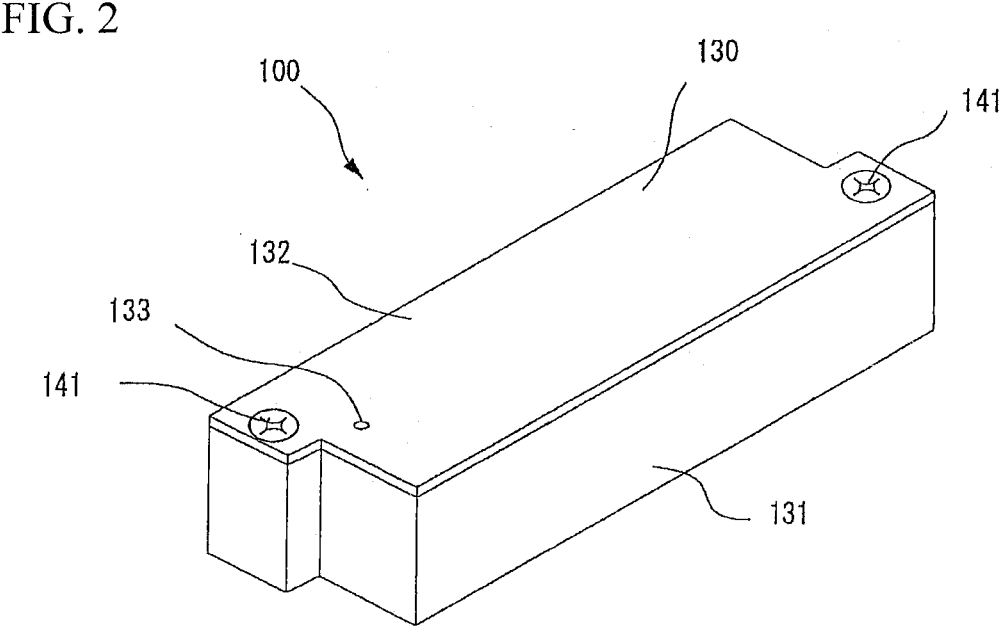
FIG. 2 is an exterior perspective view showing a transmitting unit in the embodiment of the present invention.
Figure 3:
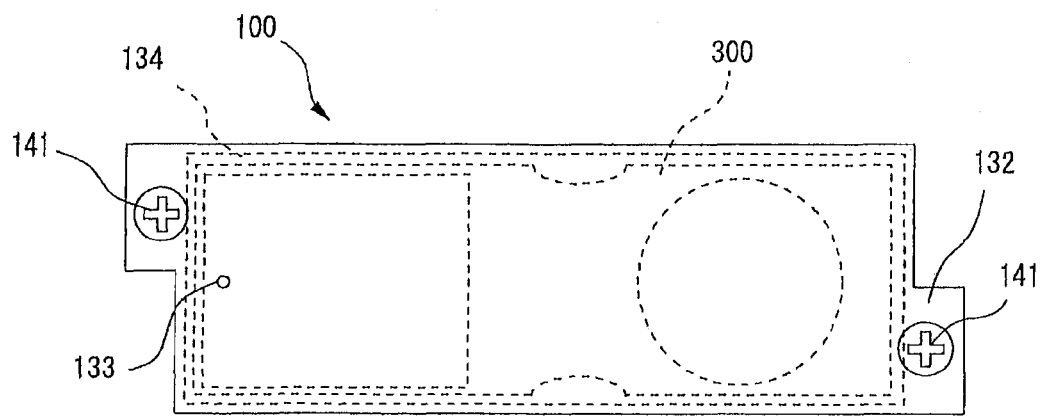
FIG. 3 is a plan view showing the transmitting unit in the embodiment of the present invention.
Figure 4:
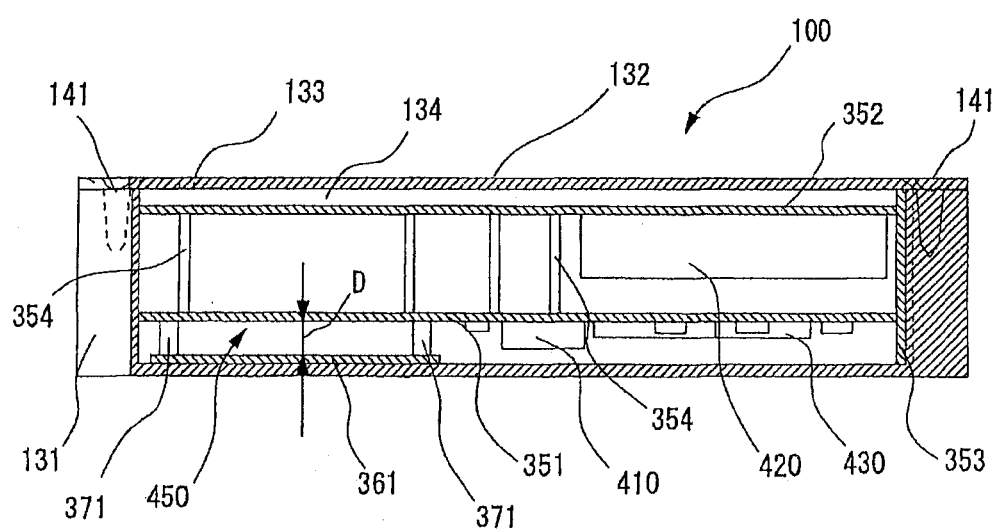
FIG. 4 is a lateral cross-sectional view showing the transmitting unit in the embodiment of the present invention.
Figure 5:
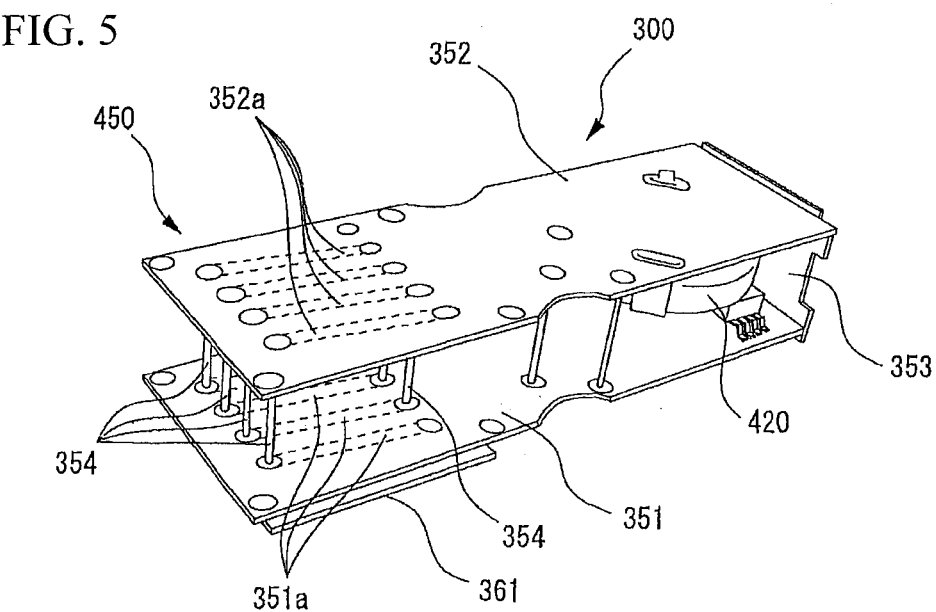
FIG. 5 is an exterior perspective view showing a unit body in the embodiment of the present invention.
Figure 6:
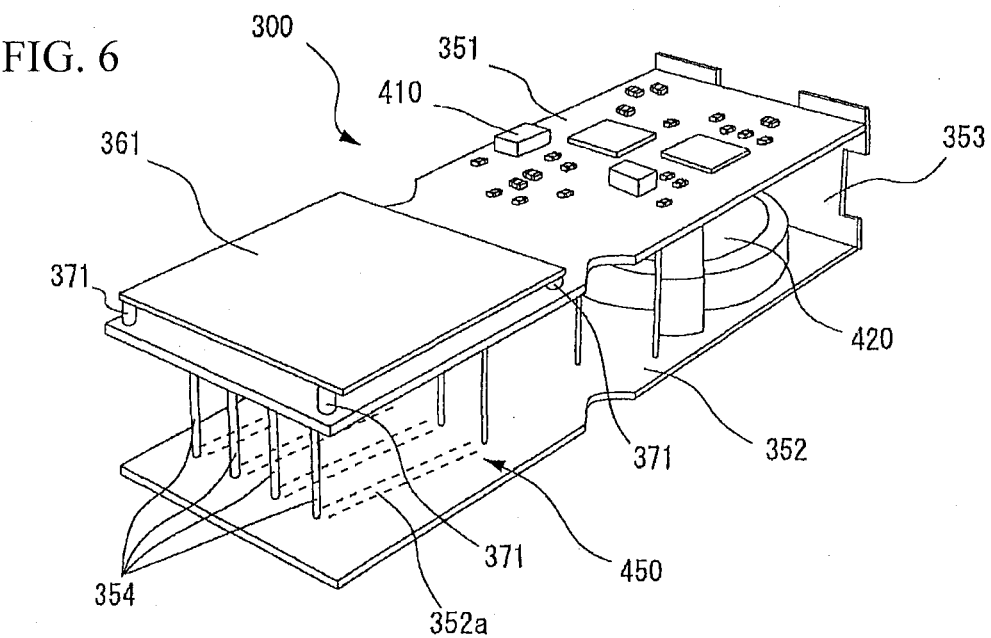
FIG. 6 is an exterior perspective view showing the unit body in the embodiment of the present invention.
Figure 7:
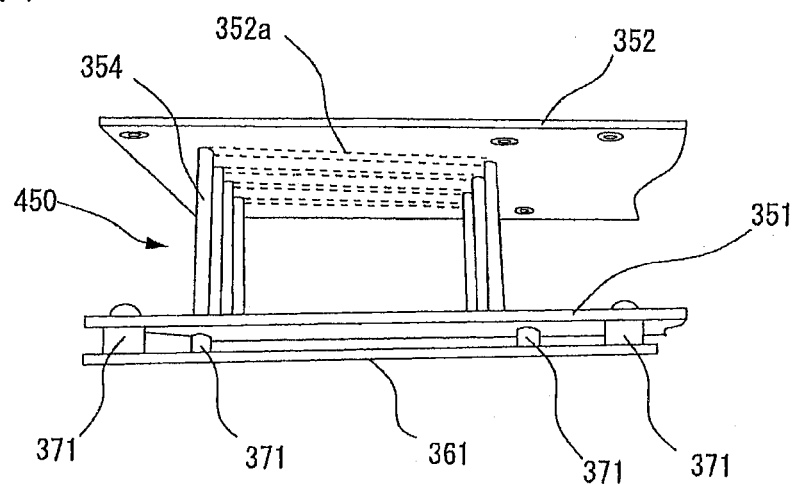
FIG. 7 is an exterior perspective view showing a main section of the unit body in the embodiment of the present invention.
Figure 8:
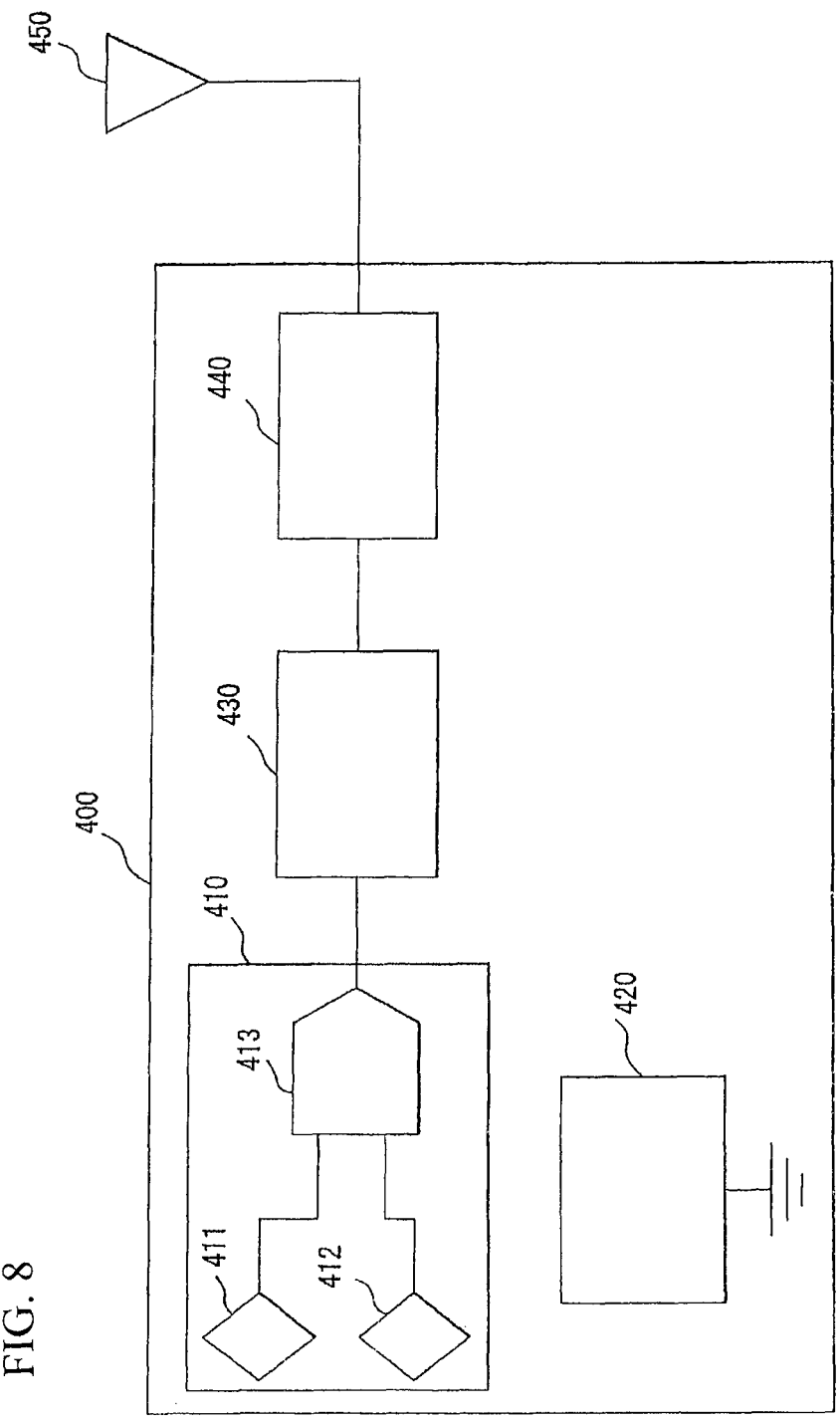
FIG. 8 is a block diagram showing an electrical circuitry of the transmitting unit in the embodiment of the present invention.

FIG. 1 is an exterior view showing a transmission device in an embodiment of the present invention; FIG. 2 is an exterior perspective view showing a transmitting unit in the embodiment of the present invention; FIG. 3 is a plan view showing the transmitting unit in the embodiment of the present invention; FIG. 4 is a lateral cross-sectional view showing the transmitting unit in the embodiment of the present invention; FIGS. 5 and 6 are exterior perspective views showing a unit body in the embodiment of the present invention; FIG. 7 is an exterior perspective view showing a main section of the unit body in the embodiment of the present invention; and FIG. 8 is a block diagram showing an electrical circuitry of a transmitting unit in the embodiment of the present invention.

In the drawings, 10 is a transmission device, which is constituted by eight transmitting units 100 (100a to 100h) accommodated inside a cylindrical case 11 that is formed of an insulator that is transmissive of radio waves.

The transmitting units 100 (100a to 100h) are all of the same shape, constituted by a unit body 300 accommodated within a substantially rectangular parallelepiped case 130 that is formed of an insulator that is transmissive of radio waves.

As shown in FIGS. 2 to 4, the case 130 of the transmitting unit 100 is substantially rectangular parallelepipedal in shape having at the lengthwise end portions thereof protruding sections for screw fastening purposes, and is constituted by a case body 131 and a cover 132. As shown in FIG. 4, an accommodating space 134 for housing the unit body 300 is formed in the interior of the case body 131, and the opening of the accommodating space 134 is sealed off by affixing the cover 132 to the case body 131 by screws 141. A vent hole 133 is formed in the cover 132, so that even in a state in which the cover 132 has been affixed to the case body 131, air can flow from the outside into the accommodating space 134 through this vent hole 133.

As shown in FIGS. 5 to 7, in the unit body 300, two printed circuit boards 351, 352 of substantially rectangular shape are disposed parallel to one another with a predetermined interval therebetween, the boards being affixed to one another by columnar connecting conductors 354 that constitute an antenna 450, and by a third printed circuit board 353 for linking purposes. The coil-shaped antenna 450, which has a center axis that extends in the width direction of the first and second printed circuit boards 351, 352, is formed in the other end portion in the lengthwise direction of the unit body 300, while electronic components, such as a sensor portion 410, a battery cell 420, and the like, that constitute an electronic circuit are mounted at one end. The linking printed circuit board 353 is soldered to the respective two printed circuit boards 351, 352.

The first printed circuit board 351 and the second printed circuit board 352 are linked by the plurality of columnar connecting conductors 354 furnished therebetween, the connecting conductors affixing one of the printed circuit boards to the other printed circuit board with a predetermined interval therebetween and conductively connecting the printed wiring of one printed circuit board and the printed wiring of the other printed circuit board.

A detection-transmitting/reception circuit 400, shown in FIG. 8, is formed in the unit body 300. Specifically, the detection-transmitting/reception circuit 400 is constituted by the sensor portion 410, the battery cell 420, a main control portion 430, a transmitting/reception portion 440, and the antenna 450.

The sensor portion 410 is mounted on the surface of the main body 300, and is constituted by an air pressure detector element 411, a temperature detector element 412, and an analog/digital conversion circuit 413. Air pressure and temperature within, for example, an air chamber of a pneumatic fender, are detected by the air pressure detector element 411 and the temperature detector element 412, and the detection results are converted to digital values by the analog/digital conversion circuit 413, and output to the main control portion 430.

The battery cell 420 is linked to the unit body 300 by a connecting conductor, and is designed to supply power to the detection-transmitting/reception circuit 400 formed in the unit body 300.

The main control portion 430 is constituted by known elements such as a CPU, memory, DIP switches, and the like; and upon receiving the detection results from the sensor portion 410 in the form of digital values, generates digital information including the digital values to output to the transmitting/reception portion 440. In addition to digital values of the aforedescribed detection results, this digital information includes preset, unique identification information for the unit body 300 (which has been written to memory, or has been preset by a DIP switch), and a unique numeric value for the unit body 300, which is set through the DIP switch. The DIP switch may be either of flat type or of rotary type, as bng as it is possible to set any numeric value from 1 to 8 representing a transmission sequence, discussed later. In the present embodiment, two DIP switches are furnished, with a numeric value showing the order of transmission being set in the first DIP switch, and a value N equal to the total number of transmitting units 100 included in the transmission device 10 being set in the second DIP switch.

Further, the main control portion 430 transmits the numeric value unique to the unit and the detection result information on the basis of the numeric value unique to the unit set in the DIP switch; or detects the numeric value unique to the unit body from received information that has been input from the transmitting/reception portion 440, compares this detected numeric value and the numeric value unique to the unit, i.e., the numeric value representing a transmission sequence, that has been set in the DIP switch, and on the basis of the result of the comparison, transmits the numeric value unique to the unit and the detection result information.

The transmitting/reception portion 440 is switched between transmitting and receiving on the basis of an instruction from the main control portion 430, and during transmission transmits from the antenna 450 the digital information input from the main control portion 430 by radio waves of a predetermined frequency, for example, 315 MHz; while during receiving detects a digital signal from 315 MHz radio waves received via the antenna 450, extracts digital information from the detected digital signal, and outputs the information to the main control portion 430. The transmitting frequency and the reception frequency of the transmitting/reception portion 440 are set to an identical frequency.

The antenna 450 is a coil-shaped antenna, the resonance frequency of which has been set to the transmission frequency of the transmission portion 440, and is formed by a printed wiring 351a furnished to the first printed circuit board 351, a printed wiring 352a furnished to the second printed circuit board 352, and the columnar connecting conductors 354 which conductively connect the printed wiring furnished to the first printed circuit board 351 and the printed wiring furnished to the second printed circuit board 352 and which affix the printed circuit boards 351, 352 to one another.

Figure 9:
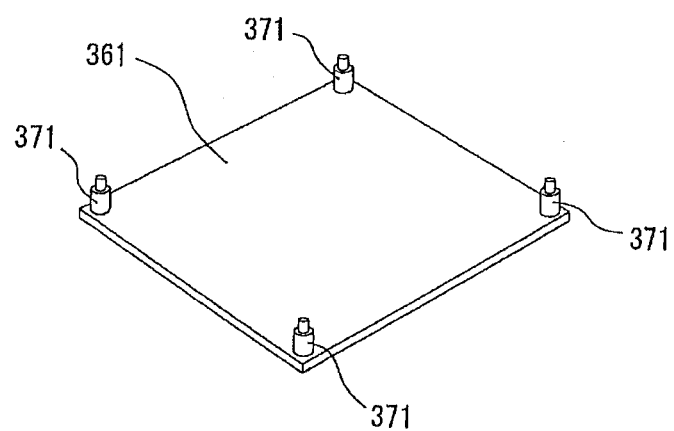
FIG. 9 is an exterior perspective view showing a planar conducting plate and a retainer in the embodiment of the present invention.
Figure 10:
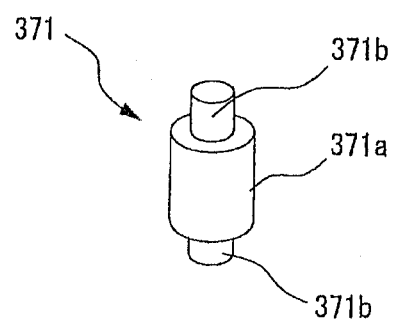
FIG. 10 is an exterior perspective view showing the retainer in the embodiment of the present invention.

Furthermore, a planar conducting plate 361 of rectangular shape is affixed by four retainers 371 to the outer face of the other end portion of the first printed circuit board 351. The planar conducting plate 361 is furnished at the position of the antenna 450, so as to be parallel to the printed circuit board 351 that is positioned to the bottom face side of the case body 131 when the unit body 300 is housed within the case 130. The planar conducting plate 361 is affixed by the retainers 371 in such a way that a predetermined interval is maintained with respect to the first printed circuit board 351. This planar conducting plate 361 is conductively connected to a predetermined conductor pattern (the conductor pattern connected to the negative pole of the battery cell 420) of the first printed circuit board 351, and is set to a reference potential. As shown in FIG. 9, the retainers 371 are affixed to the four corners of the planar conducting plate 361. As shown in FIG. 10, the shape of the retainers 371 is one in which a body 371a of round columnar shape is equipped at either end thereof with protruding portions 371b of round columnar shape smaller in diameter than the body 371a.

Figure 11:
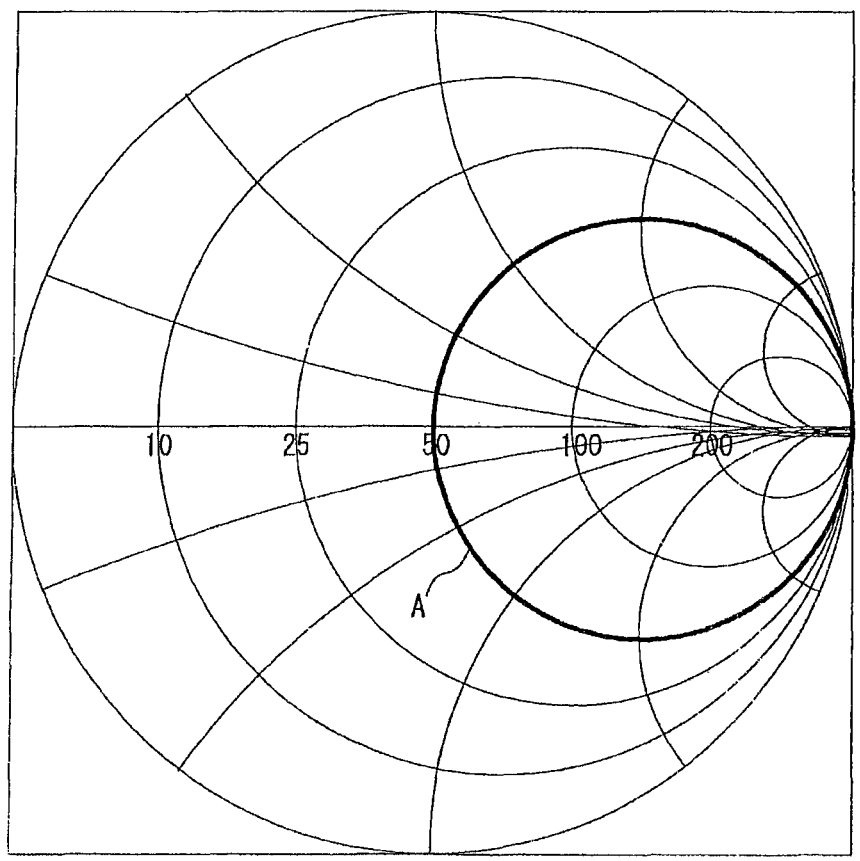
FIG. 11 is a Smith chart describing antenna characteristics in the embodiment of the present invention.

In a state in which the planar conducting plate 361 has been installed on the printed circuit board 351, the resonance frequency of the antenna 450 is 315 MHz, the characteristic curve, employing a Smith chart, being represented as curve A shown in FIG. 11. The antenna impedance at 315 MHz is 50 ohms. The interval D between the printed circuit board 351 and the planar conducting plate 361 at this time has been set to 1.5 mm by the retainers 371.

In the present embodiment, the eight transmitting units 100 are disposed in such a way that, even with the eight transmitting units 100 accommodated within the minimum space necessary within the case 11 of the transmission device 10, the decline in transmit gain is minimized so that emission of radio waves can take place in a satisfactory manner.

Furthermore, in the present embodiment, the transmitting timing is set automatically, simply among the eight transmitting units 100a to 100h. Specifically, because the transmitting units 100a to 100h of the present embodiment are classed as wireless equipment using radio waves of a frequency in the 315 MHz band, it is stipulated by regulations that the units be furnished with a predetermined transmission pause time during wireless transmission, with the object of avoiding interference and the like. Regulations specify a transmission pause time of 10 seconds or more. Therefore, in order for the transmission device 10 to be able to transmit information such as air pressure, temperature, and the like within time intervals t of less than 10 seconds, in the present embodiment, the transmitting units 100a to 100h are designed such that transmitting information takes place each time that the given time T elapses, this given time T is set to 10 seconds, the time t is set to 10/8 seconds (=1.25 seconds), and the transmitting units 100a to 100h transmit information in order each time that the time t elapses.

Next, specific examples of the present embodiment are described.

EXAMPLE 1

In Example 1, the DIP switches of each of the transmitting units 100a to 100h are set to numeric values, unique to each of the transmitting units 100a to 100h, selected from preset numeric values from 1 to N (N=8) that represent the order of transmission and that are different from the numbers set for the other transmitting units; and to the numeric value N. Furthermore, the transmitting units 100a to 100h are designed such that, when the value obtained by subtracting 1 from the unique value of the unit itself to which the DIP switch has been set is a positive value, the value of this subtraction result is stored as a trigger value; whereas when the subtracted value is negative, the aforedescribed value of N is stored as a trigger value.

When at startup the aforedescribed numeric value unique to the unit is 1, each of the transmitting units 100a to 100h transmits the numeric value unique to the unit, together with the information about the aforedescribed detection results.

Moreover, the transmitting units 100a to 100h are adapted to clock elapsed time subsequent to the numeric value detected from the received signal input by the transmitting/ reception portion 440 becoming coincident with the aforedescribed trigger value; and, when the elapsed time so clocked becomes coincident with the predetermined time t, to transmit the numeric value unique to the unit itself which shows the order of transmission, together with the information about the aforedescribed detection results.

Figure 12:
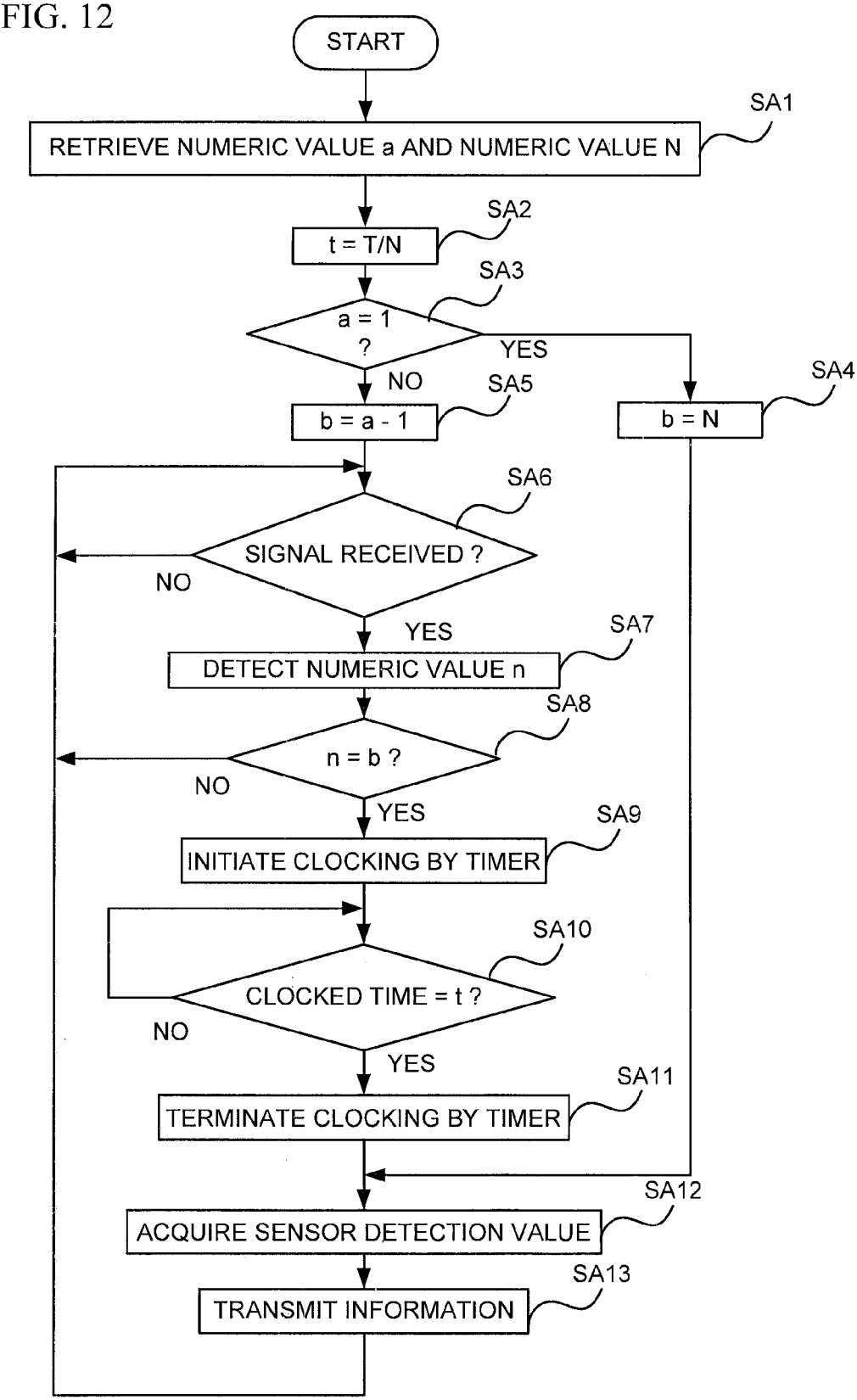
FIG. 12 is a flow chart describing operation of the transmitting unit in example 1 of the present invention.
Figure 13:
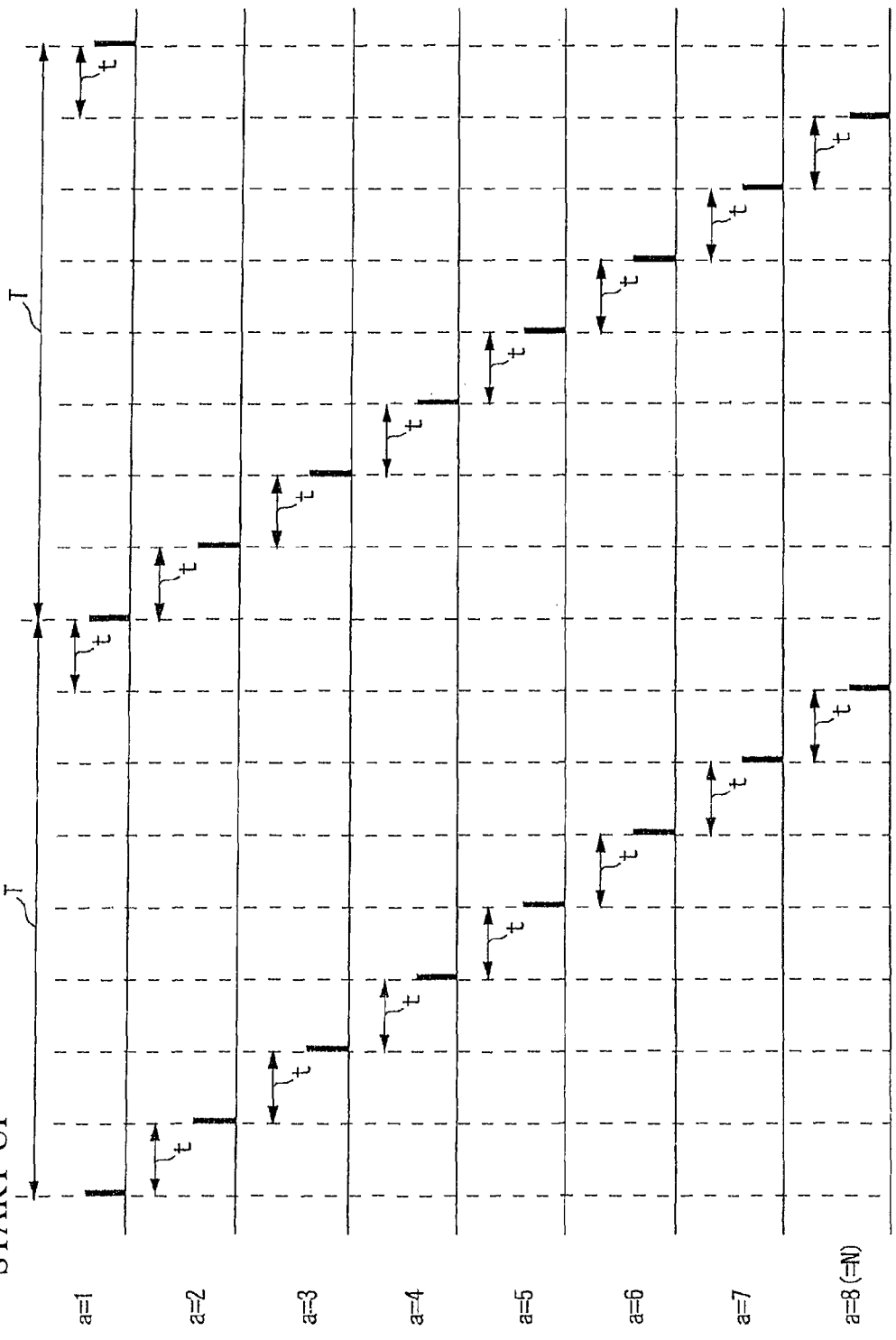
FIG. 13 is a timing chart describing operation of the transmitting unit in the example 1 of the present invention.

Next, the operation of each of the transmitting units 100a to 100h discussed above, specifically, the operation of a program stored in the memory in each of the transmitting units 100a to 100h for the purpose of operation of the CPU of each of the transmitting units 100a to 100h, is described with reference to the flowchart of FIG. 12 and the timing chart of FIG. 13.

Instantaneously with startup, each of the transmitting units 100a to 100h retrieves, from the settings in the DIP switches, a numeric value "a" showing a transmission sequence, and the numeric value N showing the total number of transmitting units 100a to 100h with which the transmission device 10 is equipped (SA1). Next, the transmitting units 100a to 100h store a time t, which is a value calculated by dividing the time T by the numeric value N (SA2). The time T has been preset in the program.

Further, the transmitting units 100a to 100h ascertain whether the retrieved numeric value "a" is 1 (SA3), and when the numeric value "a" is 1, store N as a trigger value b (SA4), then advance to a process SA12, discussed later; or when the numeric value "a" is not 1, store a value obtained by subtracting 1 from the numeric value "a," as the trigger value b (SA5).

Thereafter, each of the transmitting units 100a to 100h initiates reception of signals transmitted by the other transmitting units, ascertains whether a signal has been received (SA6), and when a signal has been received, extracts from the received signal a numeric value n which represents the order of transmission (SA7), and ascertains whether the extracted numeric value n is equal to the trigger value b (SA8). When the ascertained result is that the extracted numeric value n is different from the trigger value b, the unit advances to the process of SA6, discussed below.

When the ascertained result of the aforedescribed SA8 is that the extracted numeric value n is equal to the trigger value b, clocking by a timer is initiated (SA9), and it is then ascertained whether the time clocked by the timer has reached the time t discussed previously (SA10). When the ascertained result is that the time clocked by the timer has reached the time t, clocking by the timer terminates (SA11), and a detection detected by the sensor portion 410 is acquired (SA12). Information that includes the detection value and the numeric value "a" that shows the order of transmission is transmitted (SA13). Thereafter, the unit advances to the process of the aforedescribed SA6.

By operation of the CPU of each of the transmitting units 100a to 100h in the manner discussed above, the transmission device 10 can transmit information such as air pressure, temperature, and the like, within time intervals t of less than 10 seconds. In the process, transmitting of information by the respective transmitting units 100a to 100h takes place each time that the given time T elapses. Moreover, on the basis of the numeric value "a" which has been set in each of the transmitting units 100a to 100h and which shows the order of transmission, transmitting of information by each of the transmitting units 100a to 100h takes place in order every 10/8 seconds (=1.25 seconds).

EXAMPLE 2

In Example 2, the DIP switches of each of the transmitting units 100a to 100h are set to numeric values unique to each of the transmitting units 100a to 100h, selected from preset numeric values from 1 to N (N=8) representing a transmission sequence, and different from the numbers set for the other transmitting units; and to the numeric value N.

Moreover, when the aforedescribed numeric value unique to the unit itself at startup is 1, each of the transmitting units 100a to 100h transmits the numeric value unique to the unit itself, together with the information about the aforedescribed detection results.

Moreover, each of the transmitting units 100a to 100h is adapted to clock elapsed time subsequent to the numeric value detected from the received signal input by the transmitting/reception portion 440 becoming coincident with 1; and, when the elapsed time so clocked becomes coincident with a time calculated by multiplying the predetermined time t by the numeric value unique to the unit, to transmit the information about the aforedescribed detection result.

Figure 14:
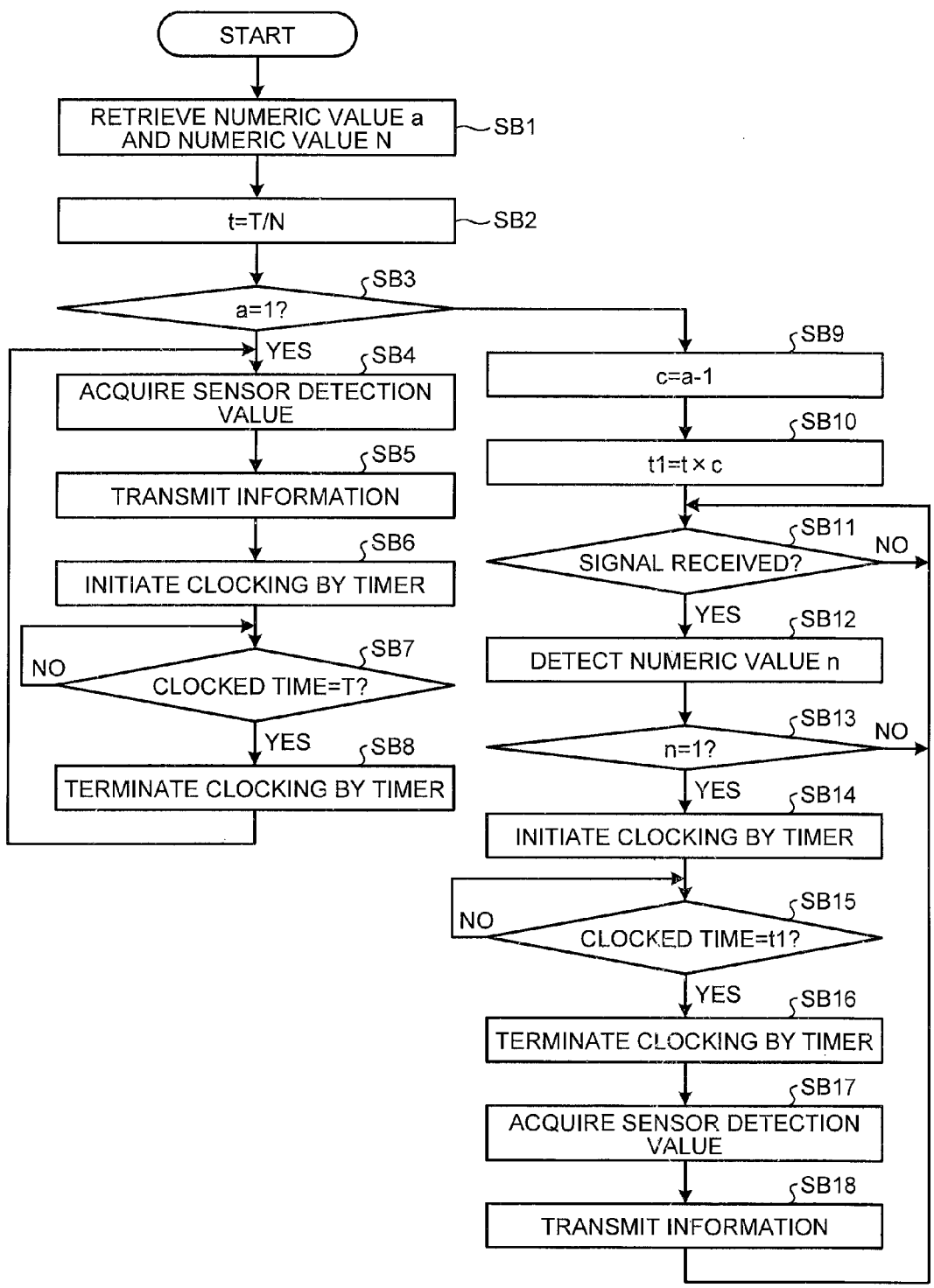
FIG. 14 is a flow chart describing operation of the transmitting unit in example 2 of the present invention.

Next, the operation each of the transmitting units 100a to 100h discussed above, specifically, the operation of a program stored in the memory in each of the transmitting units 100a to 100h for the purpose of operation of the CPU of each of the transmitting units 100a to 100h, is described with reference to the flowchart of FIG. 14 and the timing chart of FIG. 15.

Instantaneously with startup, each of the transmitting units 100a to 100h retrieves from the settings in the DIP switches a numeric value "a" showing the order of transmission, and the numeric value N showing the total number of transmitting units 100a to 100h with which the transmission device 10 is equipped (SB1). Next, the transmitting units 100a to 100h store a time t, which is a value calculated by dividing the time T by the numeric value N (SB2). The time T has been preset in the program.

Further, each of the transmitting units 100a to 100h ascertain whether the retrieved numeric value "a" is 1 (SB3), and when the numeric value "a" is 1, acquire the detection values detected by the sensor portion 410 (SB4), and transmit information that includes the detection values (SB5). Thereafter, the transmitting unit 100 for which the numeric value "a" is 1 initiates clocking by a timer (SB6), and then ascertains whether the time clocked by the timer has reached the time T discussed previously (SB7). When the ascertained result is that the time clocked by the timer has reached the time T, clocking by the timer terminates (SB8), and the unit advances to the aforedescribed process SB4.

When the ascertained result in the aforedescribed SB3 is that the retrieved numeric value "a" is a numeric value other than 1, specifically, when the read in numeric value "a" is any number from 2 to N, a factor c equal to the value obtained by subtracting 1 from the numeric value "a" is stored (SB9); and a time t1 obtained by multiplying the time t by the factor c is calculated and stored (SB10).

Thereafter, the transmitting units 100 for which the numeric value is other than 1 initiate reception of signals transmitted by the other transmitting units and ascertain whether a signal has been received (SB11), and when a signal has been received, extract from the received signal a numeric value n which represents the order of transmission (SB12), and ascertain whether the extracted numeric value n is 1 (SB13). When the ascertained result is that the extracted numeric value n is not 1, the units advance to the process of SB11 discussed previously.

When the ascertained result in the aforedescribed SB13 is that the extracted numeric value n is 1, clocking by a timer is, initiated (SB14), and it is then ascertained whether the time clocked by the timer has reached the time t1 discussed previously (SB15). When the ascertained result is that the time clocked by the timer has reached the time t1, clocking by the timer terminates (SB16), a detection value detected by the sensor portion 410 is acquired (SB17), and information that includes the detection value is transmitted (SB18). Thereafter, the unit advances to the process of the aforedescribed SB11.

By operation of the CPU of each of the transmitting units 100a to 100h in the manner discussed above, the transmission device 10 can transmit information such as air pressure, temperature, and the like, within time intervals t of less than 10 seconds. In the process, transmitting of information by the respective transmitting units 100a to 100h takes place each time that the given time T elapses. Moreover, on the basis of the numeric value "a" which has been set in each of the transmitting units 100a to 100h and which shows the order of transmission, transmitting of information by each of the transmitting units 100a to 100h takes place in order every 10/8 seconds (=1.25 seconds).

Optionally, each of the transmitting units 100a to 100h may be outfitted with memory, such as read only memory (ROM), electrically erasable and programmable read only memory (EEPROM), or the like, in which is stored identification information that includes unique identification information of each of the transmitting units 100a to 100h, and/or unique identification information of the transmission device 10. The identification information read from the memory would then be transmitted in addition to the information detected by the sensor portion 410. In so doing, when a plurality of transmission devices 10 are present, the transmission device 10 that transmitted the information can be distinguished.

In the aforedescribed embodiment, the transmitting units 100 are constituted to be able to detect both air pressure and temperature; however, the transmitting units 100 could instead be constituted to be able to detect either air pressure or temperature, or some other physical quantity.

Moreover, in the aforedescribed embodiment, the transmission device is installed in a pneumatic fender; however, there is no limitation thereto, and the transmission device of the present invention can be applied in applications besides pneumatic fenders.

Setting of the transmitting timing in a plurality of transmitting units can take place automatically, simply through communication among the transmitting units, so that the units emit radio waves in order within predetermined time intervals, whereby a transmission device that obviates the need for transmitting timing to be set from outside the plurality of transmitting units can be easily configured.

The invention claimed is:

1. A transmission device, comprising:
N number of transmitting units for transmitting predetermined information by radio waves of identical frequency each time that a given time T elapses, wherein each of the transmitting units have;
an information storage component configured to store, from among preset numbers from 1 to N representing a transmission sequence, a numeric value N, as well as a numeric value unique to the unit, which is different from numeric values stored in other of the transmitting units;
a trigger value determining component configured to, when a value obtained by subtracting 1 from the numeric value unique to the unit is positive, store the subtraction result as a trigger value, or when the subtracted value is negative, store the value of N as a trigger value;
a receiver configured to receive radio waves of the frequency;
an at-startup transmitter configured to transmit the numeric value unique to the unit and the predetermined information when the numeric value unique to the unit is 1 at startup;
a detector configured to detect the numeric value from a radio wave signal received by the receiver;
a clock configured to clock time elapsed after the detected numeric value matches the trigger value; and
a transmitter configured to transmit the predetermined information and the numeric value unique to the unit when the elapsed time clocked by the clock matches a predetermined time t that is less than the given time T.

2. The transmission device according to claim 1, wherein the time t is set to a value obtained by dividing the given time period T by the N (T/N).

3. The transmission device according to claim 1, wherein each of the transmitting units includes a sensor for detecting ambient air pressure, and a converter configured to convert information about detection values of the sensor into the predetermined information.

4. The transmission device according to claim 1, wherein each of the transmitting units includes:
an identification information storage component configured to store identification information different for each of the transmitting units in advance; and
a transmitter configured to transmit the identification information, together with the predetermined information.

5. A transmission device, comprising:
N number of transmitting units for transmitting predetermined information by radio waves of identical frequency each time that a given time T elapses, wherein
a single reference transmitting unit of the transmitting units has;
an information storage component configured to store a value of 1, as a preset numeric value unique to the unit, the numeric value representing a transmission sequence; and
a reference transmitting unit configured to transmit the predetermined information and the numeric value unique to the unit each time that the given time T elapses; and
the transmitting units other than the reference transmitting unit have;
an information storage component configured to store, from among preset numbers from 1 to N, the numeric value unique to the unit other than 1, the numeric value representing a transmission sequence and differing from numbers stored in other transmitting units;
a factor determining component configured to store as a factor c a value obtained by subtracting 1 from the numeric value unique to the unit;
a receiver configured to receive radio waves of the frequency;
a detector configured to detect the numeric value from a signal of radio waves received by the receiver;
a clock configured to clock time elapsed after the numeric value detected by the detector matches 1; and
a transmitter configured to transmit the predetermined information when the elapsed time clocked by the clock matches a time obtained by multiplying, by the factor c, a predetermined time t shorter than the given time period T.

6. The transmission device according to claim 5, wherein the time t is set to a value obtained by dividing the given time period T by the N (T/N).

7. The transmission device according to claim 5, wherein each of the transmitting units includes a sensor for detecting ambient air pressure, and a converter configured to convert information about detection values of the sensor into the predetermined information.

8. The transmission device according to claim 5, wherein each of the transmitting units includes:

an identification information storage component configured to store identification information different for each of the transmitting units in advance; and a transmitter configured to transmit the identification information, together with the predetermined information.

* * * * *